W. H. YOUNG.
PLOW.
APPLICATION FILED FEB. 16, 1917.
1,244,274.
Patented Oct. 23, 1917.
2 SHEETS—SHEET 2.
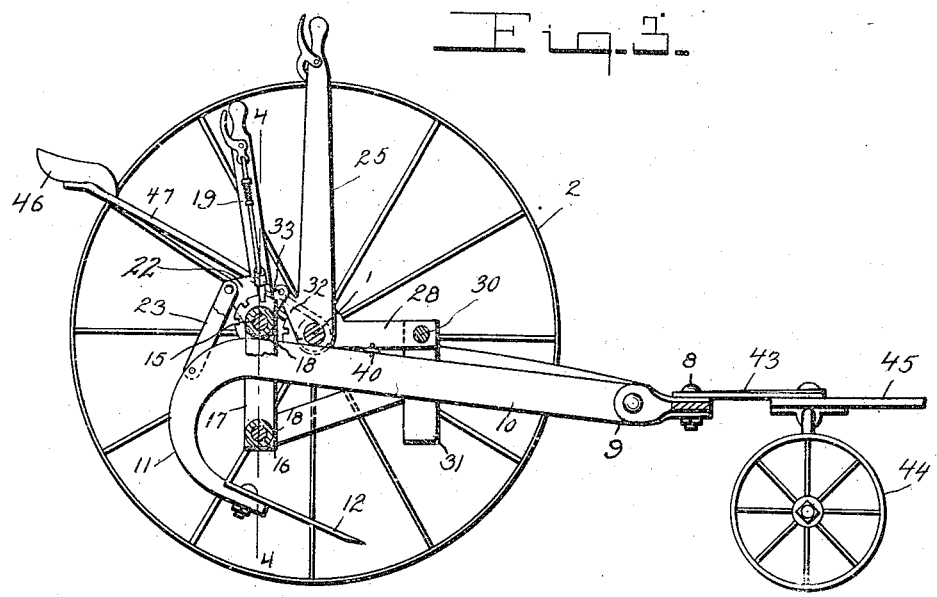
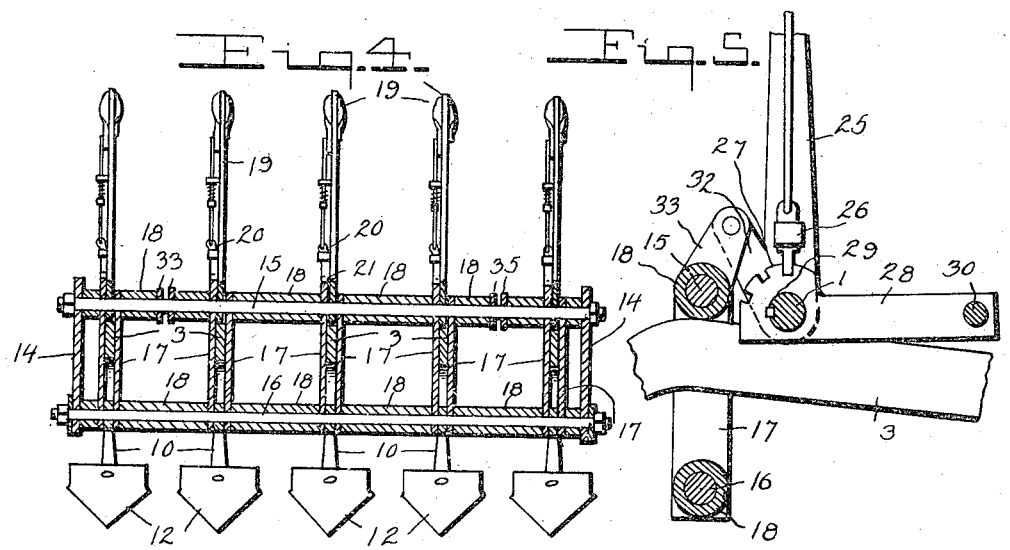
Witnesses
R M Jones
Rob't Meyer
Inventor
W. H. Young

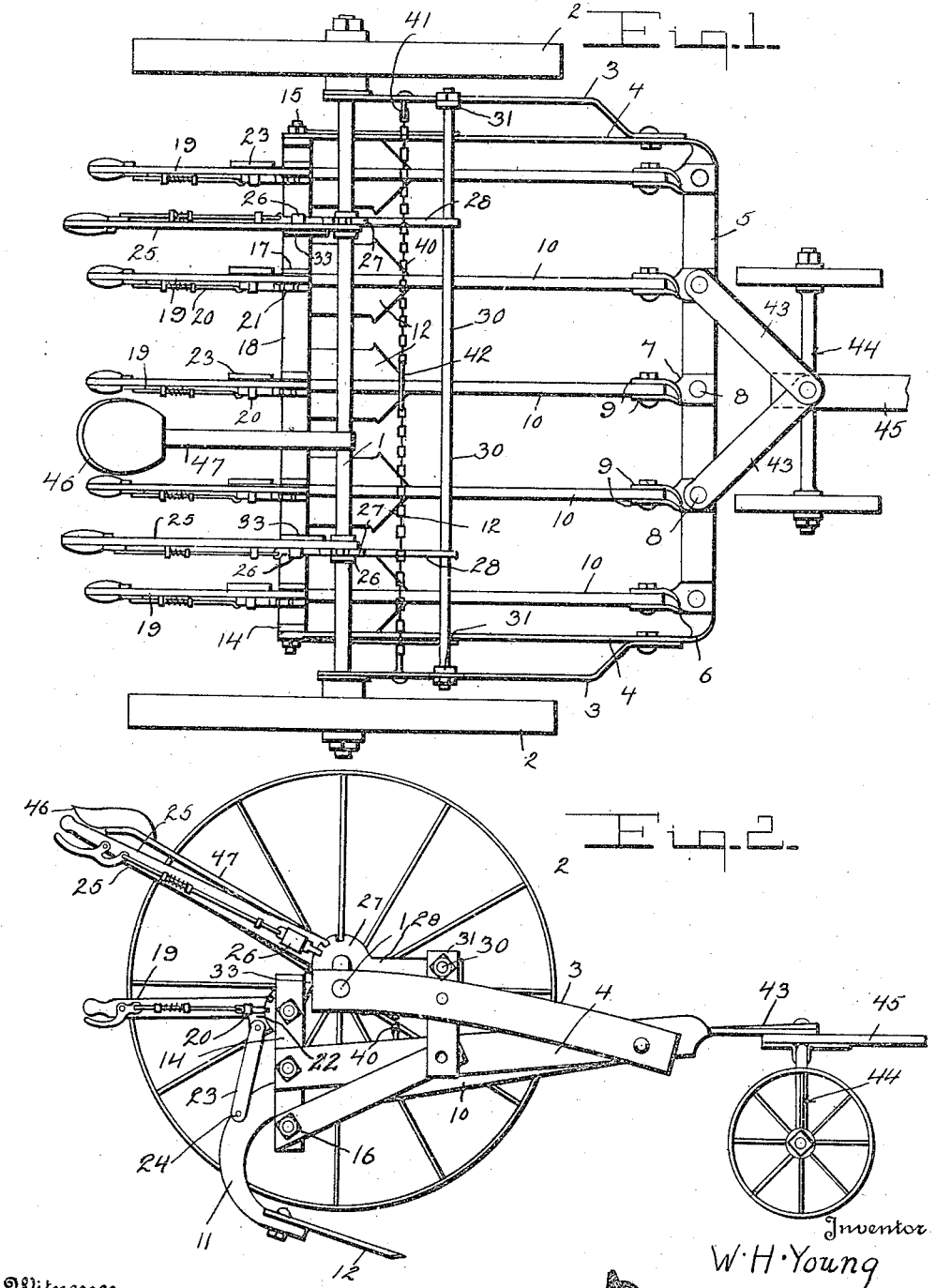

UNITED STATES PATENT OFFICE.

WILLIAM H. YOUNG, OF NEWTON, KANSAS.

PLOW.

1,244,274. Specification of Letters Patent. Patented Oct. 23, 1917.

Application filed February 16, 1917. Serial No. 149,016.

*To all whom it may concern:*

Be it known that I, WILLIAM H. YOUNG, a citizen of the United States, residing at Newton, in the county of Harvey and State of Kansas, have invented certain new and useful Improvements in Plows; and I do hereby declare the following to be a full, clear, and exact description of the invention, such as will enable others skilled in the art to which it appertains to make and use the same.

This invention relates to a plow, and the primary object of the invention is to provide a wheeled plow structure including a plurality of pivotally mounted beams, to the lower rear downturned ends of which are connected a plurality of ground loosening shovels or blades which are adapted to loosen the ground so that it may be planted with wheat, oats, or the like, or particularly for the planting of wheat where it is desired to retain the stubble on the surface of the ground, for the purpose of preventing wind from blowing away the loose soil, and also for facilitating the holding of snow upon the surface of the ground and aiding in the retaining of moisture, all of which adds to the producing properties of the ground.

Another object of this invention is to provide a plow structure as specified which includes an arch axle, upon the spindle ends of which are mounted the usual type of supporting wheels, and to provide a supporting structure to which a plurality of plow beams are pivotally connected. The rear ends of the plow beams are positioned slidably between a pair of guides, which guides are carried by a pair of rods and held in proper spaced relation to each other by means of spacing collars.

A further object of the invention is to provide a series of hand levers carried by the uppermost of said rods and connected to said plow beams through the medium of a pair of pivoted arms, for raising or lowering any one of the plow beams independently of movement of the other, and further to provide a pair of hand levers which are carried by the arch axle and connected to the uppermost of said rods for raising all of said plow beams in unison.

A further object of this invention is to provide a chain, which is connected to the sides of the supporting structure, and to the central one of said plow beams for preventing lateral shifting or swinging movement of the beams.

With the foregoing and other objects in view, this invention consists in such novel features of construction, combination and arrangement of parts, as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a top plan view of the improved plow;

Fig. 2 is a side elevation of the plow having one of the supporting wheels removed;

Fig. 3 is a section through the plow;

Fig. 4 is a section on the line 4—4 of Fig. 3; and

Fig. 5 is an enlarged detail section illustrating one of the lever constructions.

Referring more particularly to the drawings, 1 designates the arch axle of the plow structure upon the spindle ends of which are mounted the usual type of supporting wheels 2. The axle 1 carries a pair of bars 3 connected thereto and extending forwardly therefrom, the forward ends of which bars are connected to the side rails 4 of the supporting frame of the plow structure. A bar 5 extends laterally across the front end of the supporting frame of the plow structure and it is preferably formed integrally with the side rails 4, being twisted as shown at 6 so as to position the bar 5 in a horizontal plane. The bar 5 has a plurality of members 7 connected thereto in any suitable manner as shown at 8, each of which members are provided with a pair of spaced ears 9 to which plow beams 10 are pivotally connected. The plow beams 10 extend rearwardly of the bar 5 and they have their rear ends curved downwardly as shown at 11, as is ordinary in the construction of plow beams. The plow blades or bottoms 12 are attached to the rear lower ends of the beams 10 in any suitable manner, and they are shaped similarly to a cultivator shovel, being provided for loosening the soil without turning the same.

A pair of vertically extending bars 14 are attached to the side rails 4 and they extend above and below the side rails, as clearly shown in Fig. 2 of the drawings. Rods 15 and 16 are carried by the bars 14 and extend transversely across the plow supporting frame, the bar 15 being positioned directly above the bar 16. A plurality of spaced guide bars 17 are carried by the rods 15 and 16 and these spaced guide bars form guides for the plow beams 10 which are positioned between each pair of the bars 17, as clearly shown in Fig. 4 of the drawings. The bars 17 are held in proper spaced relation upon the rods 15 and 16 by spacing collars 18.

Positioned between the upper ends of each pair of guide bars 17 and pivotally mounted upon the rod 15 is a hand lever 19 which has the usual type of dog mechanism 20 carried thereby for coaction with a quadrant 21. The quadrant 21 is formed upon the upper end of one of the bars 17. Each of the levers 19 has a cam-like enlargement 22 formed thereon, to which is pivotally connected a pair of bars 23. The bars 23 are in turn pivotally connected as shown at 24 to the beams 10, so that the beams may be raised or lowered by the operation of the hand lever 19.

So that all of the shovels or beams may be raised in unison, a pair of hand levers 25 are provided. These hand levers 25 are pivotally mounted upon the arch axle 1 and they have dog mechanisms 26 carried thereby, for coaction with quadrants 27. The quadrants 27 are formed upon the rear upper edges of bars 28. The bars 28 are keyed to the axle 1 as shown at 29, and their forward ends are connected to a rod 30. The rod 30 extends transversely across the plow and is supported by suitable upstanding brackets 31 which are carried by the bars 3. Upstanding rearwardly extending projections 32 are formed upon the levers 25 and they have bars 33 pivotally connected thereto. The bars or plates 33 are in turn connected to the rod 15 so that when the hand levers 25 are raised or lowered, both the rods 15 and 16 and consequently all of the plow beams will be raised in unison.

A chain or flexible member 40 is connected as shown at 41 to the bars 3 and through the medium of a lap ring 42 to the central beam 10 so as to prevent lateral or sidewise shifting all of the plow beams with respect to the bars 3 and 4.

The bar 5 has a pair of forwardly extending bars 43 connected thereto, to which is swivelly connected a front truck structure 44. The truck structure 44 may have either a long or short tongue as indicated at 45 connected thereto, as desired, this feature depending upon the desires of the person manufacturing the implement.

The usual type of seat 46, employed in agricultural implements is supported by the ordinary type of standard 47, and it is positioned so that the operator seated upon the seat can conveniently reach all of the hand levers.

When it is desired to transport the plow from one field to another, the levers 25 are operated for raising all of the plow bottoms 12 out of a land engaging position and when it is desired to plow or loosen ground, the levers 25 are lowered into the position illustrated in Fig. 2 of the drawings, which allows the plows to be embedded into the ground for loosening of the soil, and preparing the same for a seed bed. By the operation of the levers 19, any one of the plows may be raised independently of movement of any one of the other plows which is particularly advantageous in cases where stumps, roots, rocks or the like are found in the field being plowed.

If it is so desired, certain of the plow bottoms 12 may be disconnected from their beams, and the usual type of listers substituted in lieu thereof, for example an ordinary lister could be connected to the central beam 10 and to the outermost beam 10, thereby leaving shovels or plows to loosen up the middles between the rows of grain planted.

From the foregoing description taken in connection with the accompanying drawings the advantages of construction and of the method of operation of the improved plow will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a plow structure, the combination, of an arch axle, a supporting frame, braces connecting said arch axle and said supporting frame, a pair of laterally extending rods carried by the rear end of said supporting frame, a plurality of plow beams pivotally connected to the front end of said supporting frame, a plurality of pairs of guide bars carried by said rod, said plow beams extending between said guide bars.

2. In a plow structure, the combination, of an arch axle, a supporting frame, braces connecting said arch axle and said supporting frame, a pair of laterally extending rods carried by the rear end of said supporting frame, a plurality of plow beams pivotally connected to the front end of said supporting frame, a plurality of pairs of guide bars carried by said rod, said plow beams extending between said guide bars, a plurality of hand levers mounted upon the uppermost of said laterally extending rods, cam-like extensions formed upon said levers, arms pivotally connected to said extensions and to said plow beams for raising or lowering the plow beams upon pivotal movement of the levers.

3. In a plow structure, the combination, of an arch axle, a supporting frame, braces connecting said arch axle and said supporting frame, a pair of laterally extending rods carried by the rear end of said supporting frame, a plurality of plow beams pivotally connected to the front end of said supporting frame, a plurality of pairs of guide bars carried by said rod, said plow beams extending between said guide bars, a plurality of hand levers mounted upon the uppermost of said laterally extending rods, cam-like extensions formed upon said levers, arms pivotally connected to said extensions and to said plow beams for raising or lowering the plow beams upon pivotal movement of the levers, and means for raising all of said plow beams in unison.

4. In a plow structure, the combination, of an arch axle, a supporting frame, braces connecting said arch axle and said supporting frame, a pair of laterally extending rods carried by the rear end of said supporting frame, a plurality of plow beams pivotally connected to the front end of said supporting frame, a plurality of pairs of guide bars carried by said rod, said plow beams extending between said guide bars, a plurality of hand levers mounted upon the uppermost of said laterally extending rods, cam-like extensions formed upon said levers, arms pivotally connected to said extensions and to said plow beams for raising or lowering the plow beams upon pivotal movement of the levers, a hand lever pivotally carried by said supporting axle, an extension formed upon and extending upwardly and rearwardly from the pivot of said levers, a bar connected to said extension and to the uppermost of said laterally extending rods for moving all of said plow beams in unison upon pivotal movement of the last mentioned hand levers.

5. In a plow structure, the combination, of an arch axle, a supporting frame, braces connecting said arch axle and said supporting frame, a pair of laterally extending rods carried by the rear end of said supporting frame, a plurality of plow beams pivotally connected to the front end of said supporting frame, a plurality of pairs of guide bars carried by said rod, said plow beams extending between said guide bars, a plurality of hand levers mounted upon the uppermost of said laterally extending rods, cam-like extensions formed upon said levers, arms pivotally connected to said extensions and to said plow beams for raising or lowering the plow beams upon pivotal movement of the levers, a hand lever pivotally carried by said supporting axle, an extension formed upon and extending upwardly and rearwardly from the pivot of said levers, a bar connected to said extension and to the uppermost of said laterally extending rods for moving all of said plow beams in unison upon pivotal movement of the last mentioned hand levers, and flexible members connected to said brace bars and to the central of said beams for preventing lateral shifting of the beams.

In testimony whereof I affix my signature in presence of two witnesses.

WILLIAM H. YOUNG.

Witnesses:
C. H. YOUNG,
W. W. REGIER.

Copies of this patent may be obtained for five cents each, by addressing the "Commissioner of Patents, Washington, D. C."